(12) United States Patent
Chen et al.

(10) Patent No.: US 8,607,819 B2
(45) Date of Patent: Dec. 17, 2013

(54) WATER SAVING DEVICE AND METHOD OF USING SAME

(75) Inventors: Tianyu Chen, Xiamen (CN); Renzhong Li, Xiamen (CN); Robert Zhou, Xiamen (CN)

(73) Assignees: Xiamen Solex High-Tech Industries Co., Ltd., Xiamen (CN); Robert Zhou, Xiamen (CN)

( * ) Notice: Subject to any disclaimer, the term of this patent is extended or adjusted under 35 U.S.C. 154(b) by 1174 days.

(21) Appl. No.: 12/533,815

(22) Filed: Jul. 31, 2009

(65) Prior Publication Data

US 2011/0023969 A1 Feb. 3, 2011

(51) Int. Cl.
*F16K 15/14* (2006.01)
(52) U.S. Cl.
USPC .......................... 137/512.2; 137/843; 138/45
(58) Field of Classification Search
USPC ........ 137/512.1, 512.2, 843, 517; 138/45, 44; 239/590.3, 570
See application file for complete search history.

(56) References Cited

U.S. PATENT DOCUMENTS

| | | | | |
|---|---|---|---|---|
| 3,141,477 A | * | 7/1964 | Campbell et al. | 138/45 |
| 3,326,242 A | * | 6/1967 | Parkison | 138/46 |
| 4,161,965 A | * | 7/1979 | Merritt | 138/45 |
| 4,708,166 A | * | 11/1987 | Kobold | 137/512.1 |

FOREIGN PATENT DOCUMENTS

CN 2846943 Y 12/2006

\* cited by examiner

*Primary Examiner* — Kevin Lee
*Assistant Examiner* — Macade Brown
(74) *Attorney, Agent, or Firm* — Rabin & Berdo, P.C.

(57) ABSTRACT

A water saving device and method of using same. The water saving device includes a sleeve and an elastomer fixed in the sleeve. The elastomer has at least a permanently-open hole, a throttling hole and a protrusion for arranging the permanently-open hole and the throttling hole. The permanently-open hole is a hole which still maintains open status after being distorted by pressure. The throttling hole is a hole which will be closed approximately after distortion by pressure. The water saving device not only has the function of decreasing the flow, but also can adjust the flow of the shower and faucet to make the flow steady.

18 Claims, 5 Drawing Sheets

WATER SAVING DEVICE AND METHOD OF USING SAME

FIELD OF THE INVENTION

The present invention relates to a device and method used in a shower or faucet to prevent a water flow from increasing rapidly and to have the water used timely.

BACKGROUND OF THE INVENTION

To use water reasonably so as not to waste water is a duty for every person. A traditional outlet device usually just has a simple valve and a water flow depends on the diameter of a pipe, because the diameter of water pipe usually is quite larger and thus a lot of water will spray out when the valve opened. Accordingly, larger amount of the water is wasted. So various water saving devices have been invented and manufactured by the persons in the field, such as a water saving gasket for tap disclosed in CN2846943 which is a protrusion gasket having a flow-restrictor hole in the middle portion. The effective area of the flow-restrictor hole is 5~80 mm$^2$, and the preferred area is 10~50 mm$^2$. However, this gasket just reduce the outlet diameter so as to reduce the flow, it can neither adjust the flow nor make the flow steady.

SUMMARY OF THE INVENTION

The object of the present invention is to provide a novel water saving device which has the function of reducing the rate of the rapidly increased flow, and can adjust the flow of the shower, faucet etc., to make the flow steady.

This object is achieved by providing:

A water saving device comprising a sleeve and an elastomer fixed in said sleeve, said elastomer having at least a permanently-open hole, a throttling hole and a protrusion for arranging said permanently-open hole and/or throttling hole; said permanently-open hole is a hole which still maintain open status after distortion by pressure, said throttling hole is a hole which will be closed approximately after distortion by pressure to block the flow.

In aforementioned water saving device, said permanently-open hole is a round hole or a hole having at least a supporting angle, said throttling hole is ellipse hole or strip-shaped.

In aforementioned water saving device, said permanently-open hole is selected from the group consisting of: square hole, triangle hole, regular polygon hole, centrally-tapered hole or flower-shaped hole.

Aforementioned water device further comprises a sleeve for said elastomer disposed therein to facilitate to fix said water saving device to the outlet device and make the water saving device fit for different diameter of installation hole.

In aforementioned water saving device, the thickness of said elastomer is configured according to the elasticity of the used material, the using situation and the water flow passing through. Generally, the strong elasticity of the material, the more sensitive to the distortion after being pressed, so the more thicker thickness can be used. According to household shower or faucet, the preferred thickness is between 0.8 mm~8 mm.

In aforementioned water saving device, the shape of said elastomer can be every possible shape such as round, square, ellipse, half-round or trefoil etc.

In aforementioned water saving device, to facilitate to transfer the pressure around the protrusion to the permanently-open hole or throttling hole, the area of said protrusion can not be too larger, accordingly, several protrusions can be configured on the elastomer, and each protrusion has a permanently-open hole or a throttling hole; the shape of the protrusion commonly is a round, without limitation, the other shapes are also be used. Certainly, different amounts of permanently-open holes or throttling holes can be set in a protrusion.

In aforementioned water saving device, said elastomer made of flexible material such as rubber, foaming rubber etc. particularly, can be made of natural rubber, synthetic rubber, neoprene, SBR (Styrene Butadiene Rubber), cis1,4-polybutadiene rubber, NBR (nitrile-butadiene rubber), styrene rubber, fluorubber or polysulfide rubber.

In aforementioned water saving device, the quantity and size of the permanently-open hole and throttling hole arranged in the elastomer can be set according to the different specification of the water saving device to be made, and the water saving device can be used in any device which need flow control.

The water saving device of the present invention has both permanently-open hole and throttling hole, therefore, when the water flow increased, the current can be controlled by the distortion of the permanently-open hole and throttling hole, thus the flow will not increased rapidly, while when the flow decreased, the flow can be added also by the restoration of the permanently-open hole and throttling hole, thus the flow will not decreased rapidly, therefore, the flow will be controlled in a steady level.

In these figures: 1 elastomer; 12 round protrusion; 13 centrally-tapered hole; 14 ellipse hole, 2 sleeve; 3 overhead shower; 4 hand held shower.

DESCRIPTION OF THE PREFERRED EMBODIMENT

Embodiment 1

Figure 1:
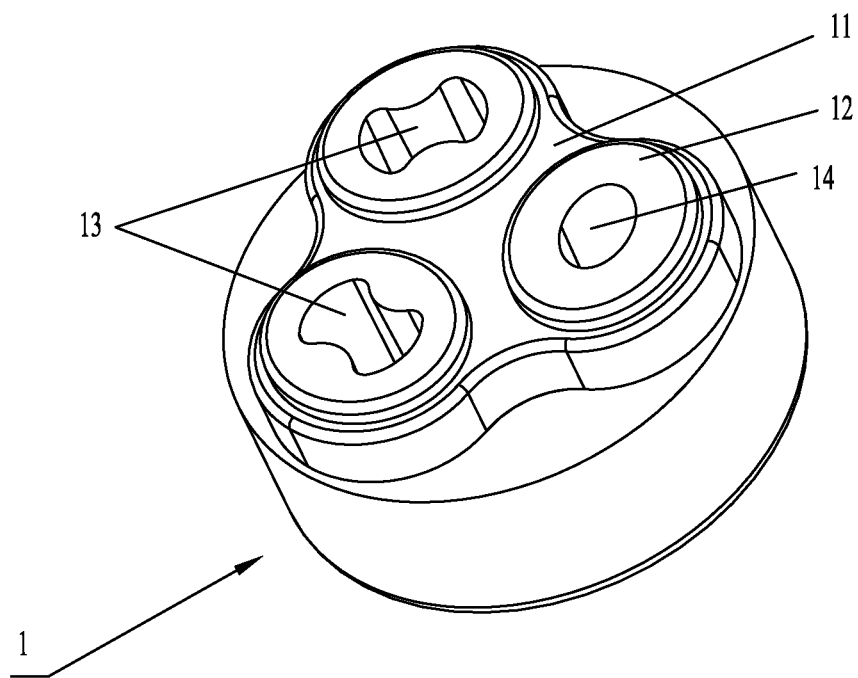
FIG. 1 is a perspective view of the elastomer of the present invention in embodiment 1.
Figure 2:
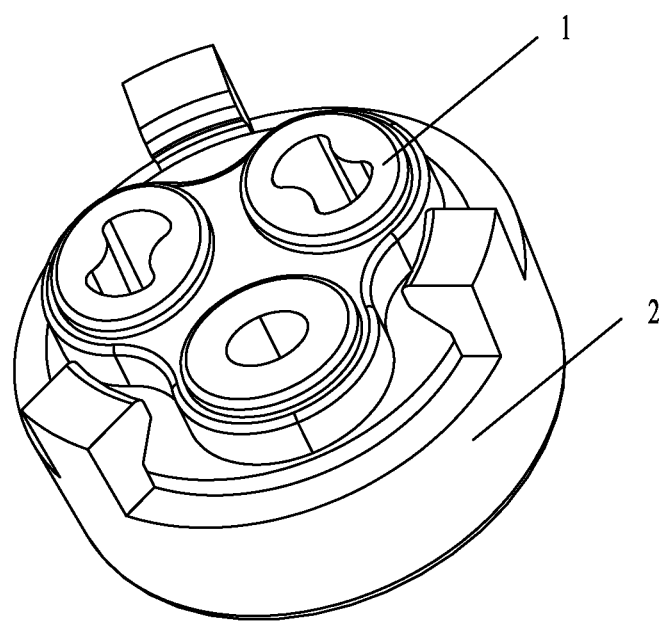
FIG. 2 is a perspective view of the water saving device of the present invention in embodiment 1.

Referring to FIG. 1 and FIG. 2, the water saving device comprising an elastomer 1 made of natural rubber with a thickness of 5 mm, the upper portion of elastomer 1 has three round protrusions 12, two of the round protrusions 12 each has a centrally-tapered hole 13 respectively, the centrally-tapered hole 13 is with two larger ends and a middle with L-shaped supporting angle, the other round protrusion 12 has an ellipse hole 14, the edge of elastomer 1 extended downwardly to form a cylinder.

The elastomer 1 fixed to the sleeve 2 via said cylinder.

Figure 3:
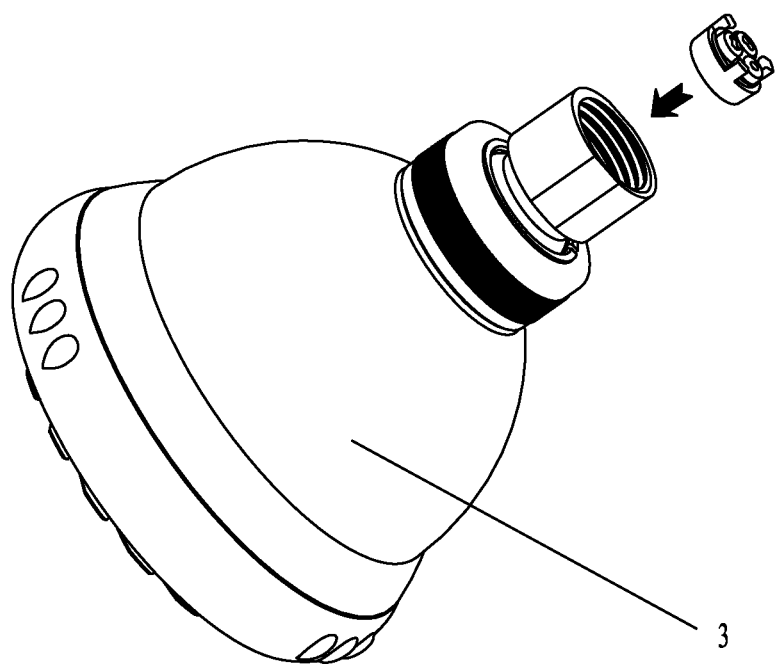
FIG. 3 illustrates the use status of the water saving device of the present invention in embodiment 1.
Figure 4:
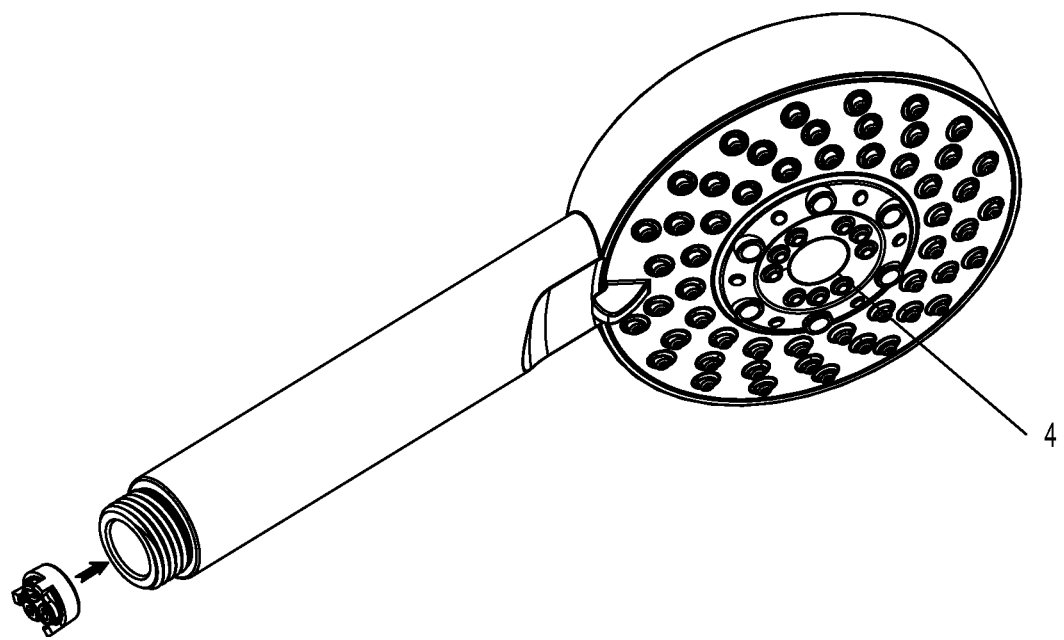
FIG. 4 illustrates another use status of the water saving device of the present invention in embodiment 1.

Referring to FIG. 3 and FIG. 4, the water saving device can be fixed to the inlet of a overhead shower 3 or hand held shower 4 so as to regulate the flow of the overhead shower 3 or hand held shower 4

When the valve of the overhead shower 3 or hand held shower 4 is turned on, the flow passing through the centrally-tapered hole 13 or ellipse hole 14 is small. At this time, according to Bernolli equation, the pressure urged on the edge of the centrally-tapered hole 13 or ellipse hole 14 is approximately equal to the pressure urged on the protrusion 12, and the shape of the centrally-tapered hole 13 or ellipse hole 14 arranged on the water saving device is unchanged, both the flow passing through the centrally-tapered hole 13 and ellipse hole 14 increased in various degree respectively.

Figure 5:
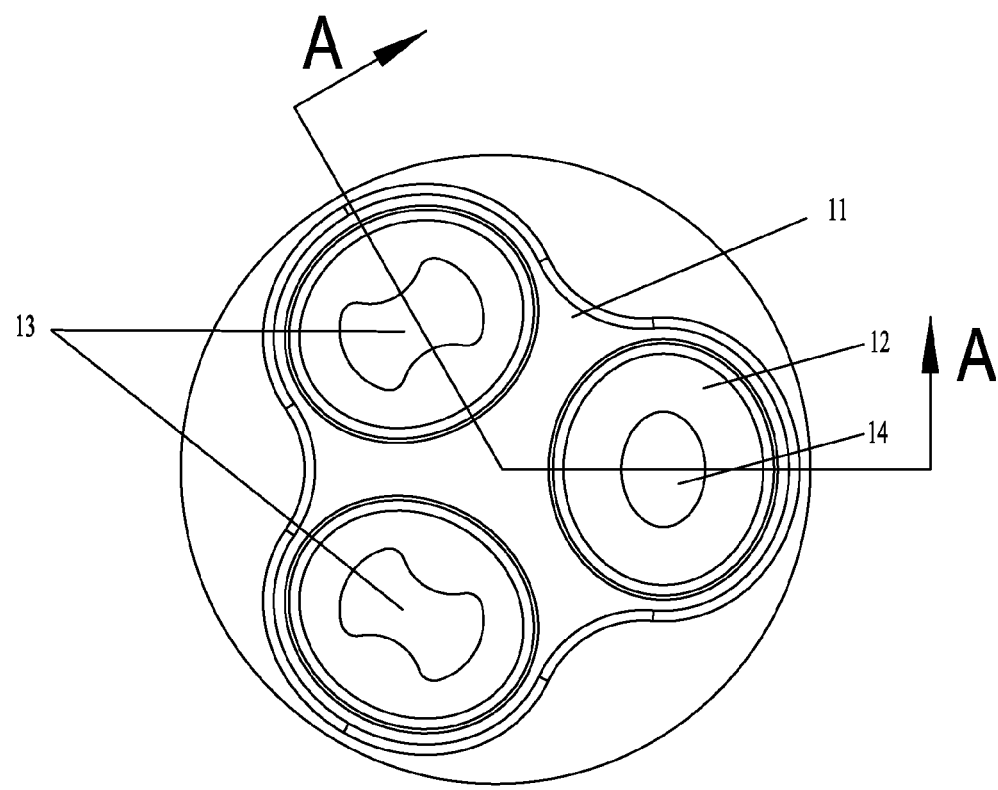
FIG. 5 is a top view of the elastomer of the present invention in embodiment 1 in nature status.
Figure 6:
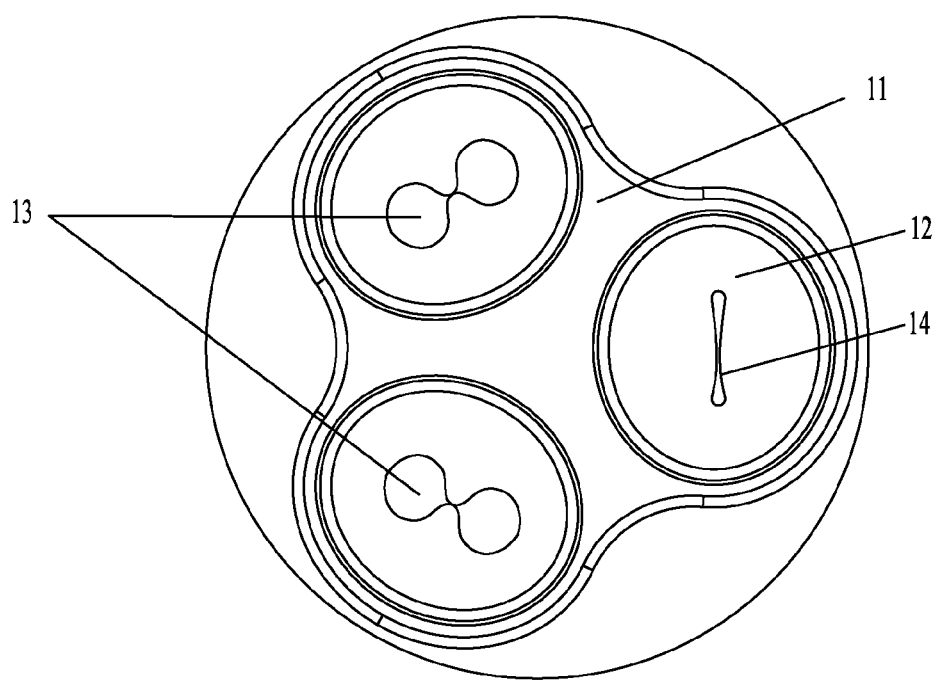
FIG. 6 is a top view of the elastomer of the present invention in embodiment 1 after distortion.
Figure 7:
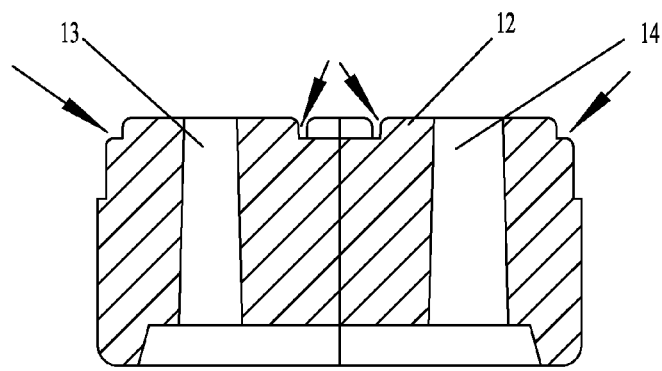
FIG. 7 is a sectional view taken along line A-A of FIG. 5.

As the valve continues to be turned on, the flow passing through the centrally-tapered hole 13 or ellipse hole 14 increases. According to Bernoulli Equation, an increase in the speed of the fluid occurs simultaneously with a decrease in pressure, therefore, the pressure urged on the edge of the centrally-tapered hole 13 or ellipse hole 14 decreases, while the velocity of flow passing through the two sides of the protrusion 12 is approximately to the velocity before. Thus, the pressure urged on the two sides of the protrusion 12 is far larger than the pressure urged on the edge of the centrally-tapered hole 13 or ellipse hole 14 so that the centrally-tapered hole 13 or ellipse hole 14 is distorted by the pressure. Referring to FIG. 5 and FIG. 6, with the increase of the flow, the ellipse hole 14 is formed a gradually closed line after distortion by pressure. Accordingly, the flow passing though the ellipse hole 14 is decreased gradually, the centrally-tapered hole 13 is distorted to form two approximately round hole with a shrinkage between them, and the flux is increased with the increase of flow (the increase rate is slightly smaller than the increase rate of the normal hole). FIG. 7 illustrates the differential pressure between the protrusion 12 and centrally-tapered hole 13 or ellipse hole 14.

Therefore, when the water passing through the water saving device increases, the centrally-tapered hole 13 and the ellipsis hole 14 are distorted so that the flow will not increase rapidly. On the other hand, when the water decreases, the centrally-tapered hole 13 or ellipse hole 14 is restored to an original shape so that the flow will not decrease rapidly, and thus the flow will be maintained in a steady level.

Figure 8:
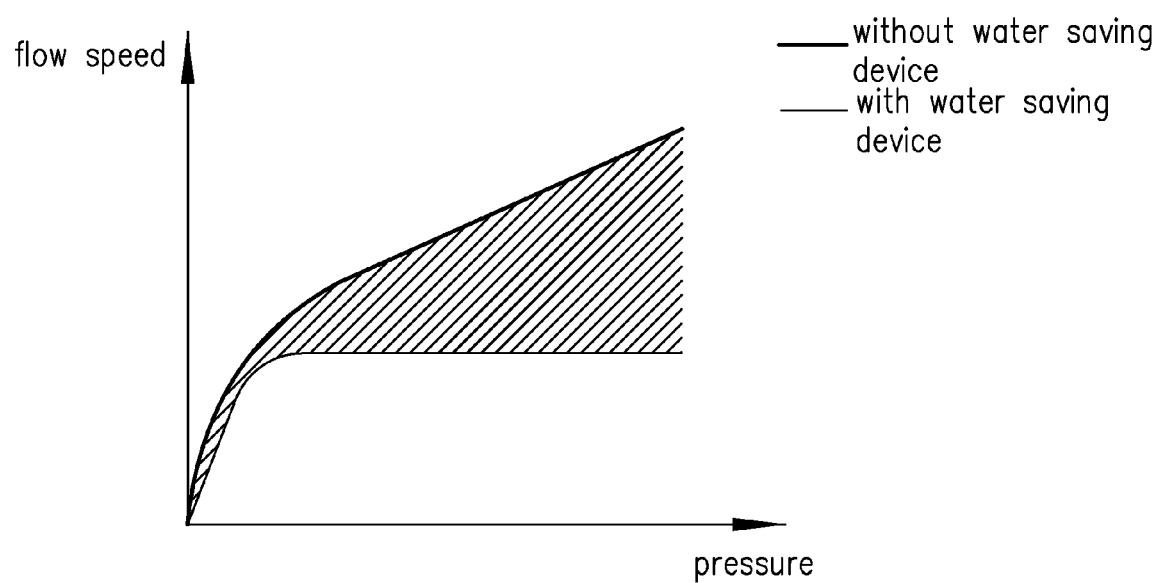
FIG. 8 is a diagram illustrates the relationship between the pressure and the flow speed of the device with the water saving device of the present invention and the device without the water saving device.

FIG. 8 is a diagram illustrates the relationship between the pressure and the flow speed of the device with the water saving device of the present invention and the device without the water saving device.

Figure 9:
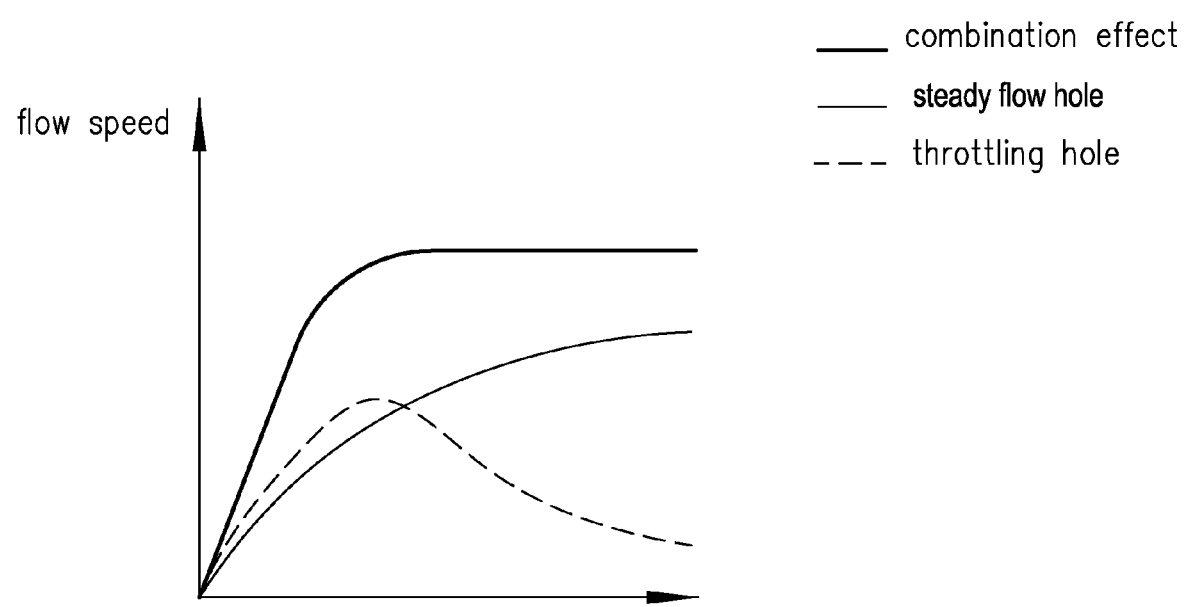
FIG. 9 is a diagram illustrates the relationship between the pressure and flow speed of the throttling hole, permanently-open hole respectively and the synthetic effect of both the throttling hole and the permanently-open hole.

FIG. 9 is a diagram illustrates the relationship between the pressure and flow speed of the throttling hole, permanently-open hole respectively and the synthetic effect of both the throttling hole and the permanently-open hole.

In the other embodiments, the centrally-tapered hole 13 can be replaced by round hole or square hole or flower-shaped-shape hole.

Taking into account the foregoing, it will be understood that several characteristics and aspects of the described embodiment can be combined with others or replaced by others to conform alternating ways of accomplishment of the water saving device. Thus, it is intended that the scope of the present invention is not limited by the particular embodiment having been described hereinbefore, but rather said scope should be defined by a reasonable reading of the following claims.

What is claimed is:

1. A water saving device comprising:
a sleeve; and
an elastomer fixed in said sleeve, said elastomer having at least a permanently-open hole, a throttling hole and a protrusion for arranging said permanently-open hole and/or throttling hole, wherein several protrusions are configured on the elastomer, and each protrusion has a permanently-open hole or a throttling hole, and said permanently-open hole and said throttling hole are spaced apart from each other,
wherein said permanently-open hole is a hole which still maintains an open status after distortion by pressure, said throttling hole is a hole which will be closed approximately after distortion by pressure to block a flow.

2. The water saving device according to claim 1, wherein said permanently-open hole is a round hole or a hole having at least a supporting angle, said throttling hole is an elliptical or strip-shaped hole.

3. The water saving device according to claim 2, wherein said permanently-open hole is selected from the group consisting of: square hole, triangular hole, regular polygon hole, centrally-tapered hole and flower-shaped hole.

4. The water saving device according to claim 3, wherein the thickness of said elastomer is between 0.8 mm~8 mm.

5. The water saving device according to claim 4, wherein said elastomer is made of flexible material.

6. The water saving device according to claim 5, wherein said flexible material is selected from the group consisting of: natural rubber, synthetic rubber, neoprene, SBR, cis1,4-polybutadiene rubber, NBR, styrene rubber, fluorubber and polysulfide rubber.

7. The water saving device according to claim 3, wherein said elastomer is made of flexible material.

8. The water saving device according to claim 7, wherein said flexible material is selected from the group consisting of: natural rubber, synthetic rubber, neoprene, SBR, cis1,4-polybutadiene rubber, NBR, styrene rubber, fluorubber and polysulfide rubber.

9. The water saving device according to claim 2, wherein said elastomer is made of flexible material.

10. The water saving device according to claim 9, wherein said flexible material is selected from the group consisting of: natural rubber, synthetic rubber, neoprene, SBR, cis1,4-polybutadiene rubber, NBR, styrene rubber, fluorubber and polysulfide rubber.

11. The water saving device according to claim 1, wherein said protrusion is round.

12. The water saving device according to claim 11, wherein said elastomer is made of flexible material.

13. The water saving device according to claim 12, wherein said flexible material is selected from the group consisting of: natural rubber, synthetic rubber, neoprene, SBR, cis1,4-polybutadiene rubber, NBR, styrene rubber, fluorubber and polysulfide rubber.

14. The water saving device according to claim 1, wherein said elastomer is made of flexible material.

15. The water saving device according to claim 14, wherein said flexible material is selected from the group consisting of: natural rubber, synthetic rubber, neoprene, SBR, cis1,4-polybutadiene rubber, NBR, styrene rubber, fluorubber and or polysulfide rubber.

16. The water saving device according to claim 1, wherein said elastomer is made of flexible material.

17. The water saving device according to claim 16, wherein said flexible material is selected from the group consisting of:

natural rubber, synthetic rubber, neoprene, SBR, cis1,4-polybutadiene rubber, NBR, styrene rubber, fluorubber and polysulfide rubber.

18. A water saving device comprising:
  a sleeve; and
  an elastomer fixed in said sleeve, said elastomer having at least a permanently-open hole, a throttling hole and a protrusion for arranging said permanently-open hole and/or throttling hole, said permanently-open hole and said throttling hole being spaced apart from each other,
  wherein said permanently-open hole is a hole which still maintains an open status after distortion by pressure, said throttling hole is a hole which will be closed approximately after distortion by pressure to block a flow, and
  wherein the protrusion includes a first protrusion in which said permanently-open hole is arranged and a second protrusion in which said throttling hole is arranged, and the first protrusion is spaced apart from the second protrusion.

* * * * *